(12) United States Patent
Zhang et al.

(10) Patent No.: US 11,022,992 B2
(45) Date of Patent: Jun. 1, 2021

(54) VOLTAGE REGULATOR

(71) Applicant: Silergy Semiconductor Technology (Hangzhou) LTD, Hangzhou (CN)

(72) Inventors: Wang Zhang, Hangzhou (CN); Chen Zhao, Hangzhou (CN); Lang Mao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/720,259

(22) Filed: Dec. 19, 2019

(65) Prior Publication Data

US 2020/0218300 A1 Jul. 9, 2020

(30) Foreign Application Priority Data

Jan. 4, 2019 (CN) .......................... 201910008805.3

(51) Int. Cl.
*G05F 1/575* (2006.01)
*G05F 1/44* (2006.01)

(52) U.S. Cl.
CPC ................ *G05F 1/575* (2013.01); *G05F 1/44* (2013.01)

(58) Field of Classification Search
CPC ..... G05F 1/10; G05F 1/46; G05F 1/12; G05F 1/40; G05F 1/44; G05F 1/56; H02M 2003/072; H02M 3/07
See application file for complete search history.

(56) References Cited

U.S. PATENT DOCUMENTS

| | | |
|---|---|---|
| 5,581,454 A | 12/1996 | Collins |
| 7,696,735 B2 | 4/2010 | Oraw et al. |
| 7,907,429 B2 | 3/2011 | Ramadass et al. |
| 8,427,113 B2 | 4/2013 | King et al. |
| 8,687,382 B2 | 4/2014 | Chen |
| 8,729,819 B2 | 5/2014 | Zhou et al. |
| 8,917,528 B2 | 12/2014 | Xu |
| 9,287,782 B2 | 3/2016 | Chen |
| 9,473,034 B2 | 10/2016 | Huang et al. |
| 9,762,128 B2 | 9/2017 | Zhang et al. |
| 9,853,460 B2 | 12/2017 | Ichikawa et al. |
| 2009/0316443 A1 | 12/2009 | Coccia et al. |

(Continued)

FOREIGN PATENT DOCUMENTS

CN 204696914 U 10/2015

*Primary Examiner* — Adolf D Berhane
(74) *Attorney, Agent, or Firm* — Michael C. Stephens, Jr.

(57) ABSTRACT

A voltage regulator can include: an input port with two terminals, and being configured to receive an input voltage; an output port with two terminals, and being configured to generate an output voltage, where the input port and the output port have a common ground potential; a group of input switches coupled in series between the two terminals of the input port, where a common node of every two adjacent input switches that form an input half-bridge topology is taken as an input switch node; at least one output half-bridge topology coupled between two terminals of the output port, where a common node of a high-side output switch and a low-side output switch in each output half-bridge topology is taken as an output switch node; and N storage capacitors, where each of the storage capacitors is coupled between one input switch node and one output switch node.

19 Claims, 19 Drawing Sheets

(56) References Cited

U.S. PATENT DOCUMENTS

| | | | |
|---|---|---|---|
| 2010/0080023 A1* | 4/2010 | Jain | H02M 3/07 363/65 |
| 2011/0154068 A1* | 6/2011 | Huang | H02M 3/07 713/300 |
| 2012/0300519 A1 | 11/2012 | Clemmons et al. | |
| 2013/0181620 A1 | 7/2013 | Zhao | |
| 2013/0201730 A1 | 8/2013 | Luo | |
| 2013/0265016 A1 | 10/2013 | Chang et al. | |
| 2015/0008894 A1* | 1/2015 | Cannankurichi | H02M 3/07 323/282 |
| 2015/0028839 A1* | 1/2015 | Petrovic | H02M 3/07 323/311 |
| 2017/0300078 A1* | 10/2017 | Puggelli | H02M 3/1582 |
| 2018/0198367 A1 | 7/2018 | Zhang et al. | |
| 2019/0058396 A1* | 2/2019 | Zhang | H02M 3/07 |
| 2020/0204067 A1* | 6/2020 | Dabral | H01L 23/5223 |
| 2020/0395845 A1* | 12/2020 | Jain | H02M 3/07 |

\* cited by examiner

VOLTAGE REGULATOR

RELATED APPLICATIONS

This application claims the benefit of Chinese Patent Application No. 201910008805.3, filed on Jan. 4, 2019, which is incorporated herein by reference in its entirety.

FIELD OF THE INVENTION

The present invention generally relates to the field of power electronics, and more particularly to voltage regulators.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
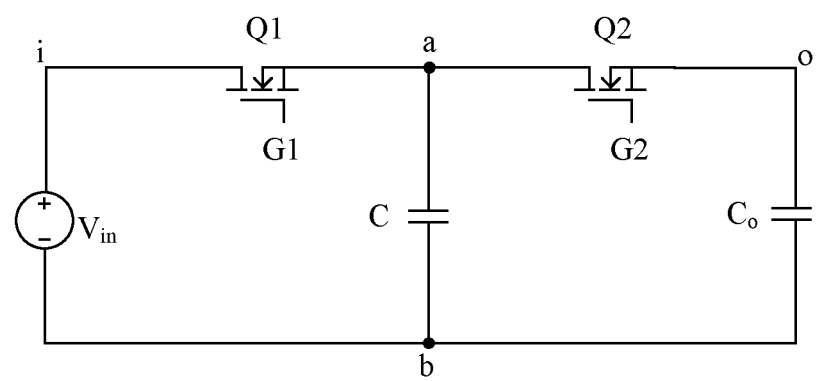
FIG. 1A is a circuit diagram of an example switched capacitor voltage regulator.

A switched capacitor voltage regulator controls the capacitors to charge and discharge through switches, thus realizing voltage conversion. Referring now to FIG. 1A, shown is a circuit diagram of an example switched capacitor voltage regulator. In this example, input voltage $V_{in}$ is applied to an input port of the switched capacitor voltage regulator. Switch Q1 is coupled between terminal a of capacitor C and terminal i of the input port, and may be turned on or off under the control of control signal G1. Switch Q2 is coupled between terminal a of capacitor C and first terminal o of the output port, and can be turned on or off under the control of control signal G2.

Figure 1B:
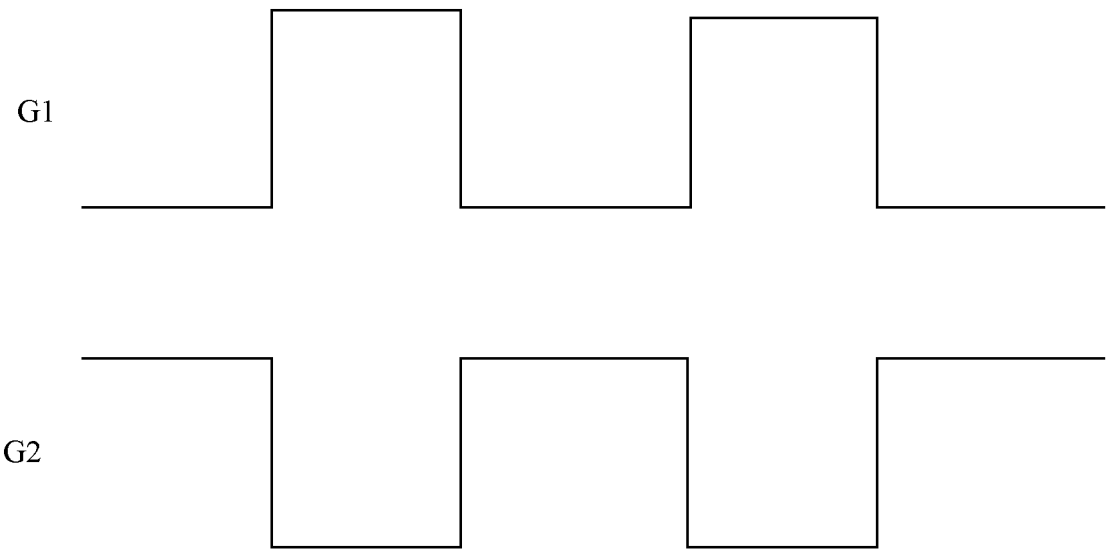
FIG. 1B is a waveform diagram of control signals for the switched capacitor voltage regulator.

Referring now to FIG. 1B, shown is a waveform diagram of control signals for the switched capacitor voltage regulator. Here, control signals G1 and G2 are complementary; that is, when control signal G1 is at a high level, control signal G2 is at a low level. In addition, terminal b of capacitor C is coupled with a second terminal of the input port and a second terminal of the output port, which are usually used as a reference terminal (or referred to as a ground terminal). Output capacitor Co can also be arranged between the two terminals of the output port to smooth output voltage $V_{out}$. Therefore, switches Q1 and Q2 can alternately be turned on and off, such that capacitor C intermittently discharges to the output port, thereby realizing power transmission and voltage/current conversion.

However, if switch Q1 and/or switch Q2 are/is damaged, such as by a short circuit, input voltage $V_{in}$ and output voltage $V_{out}$ are shorted, and input voltage $V_{in}$ can directly supply power to a load at the output port. At this time, providing that the load is a battery, if input voltage $V_{in}$ is relatively high and is directly supplied to the rechargeable battery, battery damage or even battery explosion may occur, which can be very dangerous for electronic systems and devices. Thus, necessary protection measures need to be provided to avoid such situations.

In one embodiment, a voltage regulator can include: (i) an input port with two terminals, and being configured to receive an input voltage; (ii) an output port with two terminals, and being configured to generate an output voltage, where the input port and the output port have a common ground potential; (iii) a group of input switches coupled in series between the two terminals of the input port, where a common node of every two adjacent input switches that form an input half-bridge topology is taken as an input switch node; (iv) at least one output half-bridge topology coupled between two terminals of the output port, where a common node of a high-side output switch and a low-side output switch in each output half-bridge topology is taken as an output switch node; (v) N storage capacitors, where each of the storage capacitors is coupled between one input switch node and one output switch node, such that each path from the input port to the output port comprises at least one storage capacitor; and (vi) where switching states of the input switches and the output switches are controlled to be switched to control charging and discharging states of the storage capacitors, such that a ratio of the input voltage to the output voltage is N, where N is a natural number not less than 1.

Figure 2:
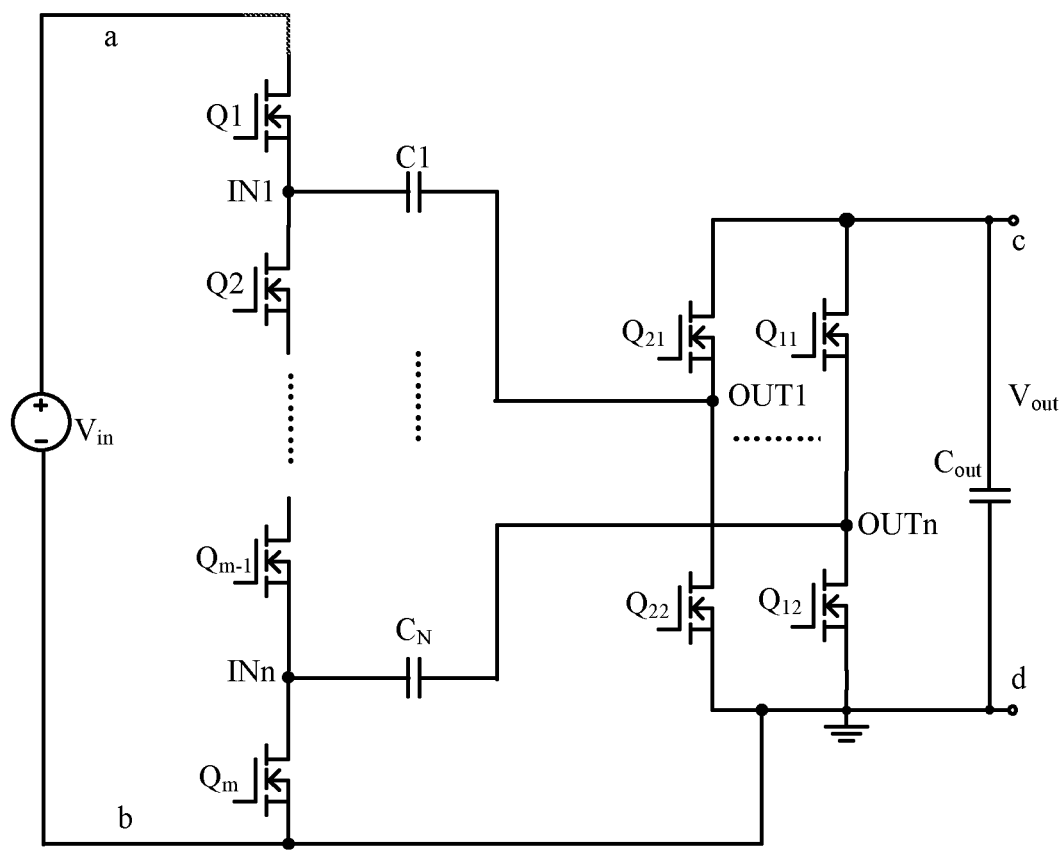
FIG. 2 is a circuit diagram of a first example voltage regulator, in accordance with embodiments of the present invention.

Referring now to FIG. 2, shown is a circuit diagram of a first example voltage regulator, in accordance with embodiments of the present invention. In this particular example, voltage regulator 200 can include an input port with two terminals a and b for receiving input voltage $V_{in}$. Here, terminal a is a positive terminal and terminal b is a negative terminal. Voltage regulator 200 can include an output port with two terminals c and d for generating output voltage $V_{out}$. Here, terminal c is a positive terminal and terminal d is a negative terminal. The input port and the output port may have the same ground terminal. For example, terminal b and terminal d can be coupled to the same ground terminal.

Voltage regulator 200 can include a group of input switches Q1-Qm coupled in series between terminals a and b of the input port, and the common nodes of every two adjacent input switches may be taken as input switches nodes IN1-INn, respectively. Further, voltage regulator 200 can include at least one output half-bridge topology between terminals c and d of the output port, and each output half-bridge topology can include two output switches (e.g., a high-side output switch and a low-side output switch) coupled in series. The common nodes of every two output switches may be taken as output switch nodes OUT1-OUTn, respectively.

Also, voltage regulator 200 can include N storage capacitors, and a first terminal of each storage capacitor is coupled to a corresponding input switch node, and a second terminal of each storage capacitor is coupled to an output switch node. For example, a plurality of second terminals of different storage capacitors can be coupled to the same output switch node, but each output switch node can be coupled to at least one storage capacitor, such that each path from the input port and the output port can include at least one storage capacitor. Further, the switching states of the input switches and the output switches can be controlled to be switched to control charging and discharging states of the storage capacitors, such that a ratio of the input voltage and the output voltage is N, where N is a natural number not less than 1.

In some embodiments, voltage regulator 200 may also include output capacitor $C_{out}$ coupled to terminals c and d of the output port to filter output voltage $V_{out}$. Also, voltage regulator 200 can include an input capacitor coupled to terminals a and b of the input port to filter input voltage $V_{in}$. For example, the number of input switches coupled in series between the input port may be provided corresponding to the step-down ratio of voltage regulator 200 and the at least one half-bridge topology coupled to the output port is arranged. Also, the number of storage capacitors coupled between the input switch nodes and the output switch nodes may be provided corresponding to the step-down ratio of voltage regulator 200. The switching states of the input and output switches can be switched to correspondingly change the charging and discharging states of the storage capacitors, in order to obtain an output voltage with a certain step-down ratio. Therefore, a higher step-down ratio can be achieved with smaller volume, the circuit topology is simple, and the power density is high.

On the other hand, the input port and the output port may have a common ground potential (e.g., the ground terminals of the input side circuit and the output side circuit are the same), and no isolation between the input side and the output side may be required, thereby further simplifying the circuit topology of the voltage regulator. In addition, the storage capacitors can be coupled between the input side circuit and the output side circuit of the voltage regulator, such that there is no direct loop between the input port and the output port. This can ensure that when the input switches and/or the output switches are damaged (e.g., via short circuit), the storage capacitors remain between the input port and the output port, thus preventing the direct connection between the load at the output port and the input voltage, protecting the load, and obtaining good reliability.

Figure 3A:
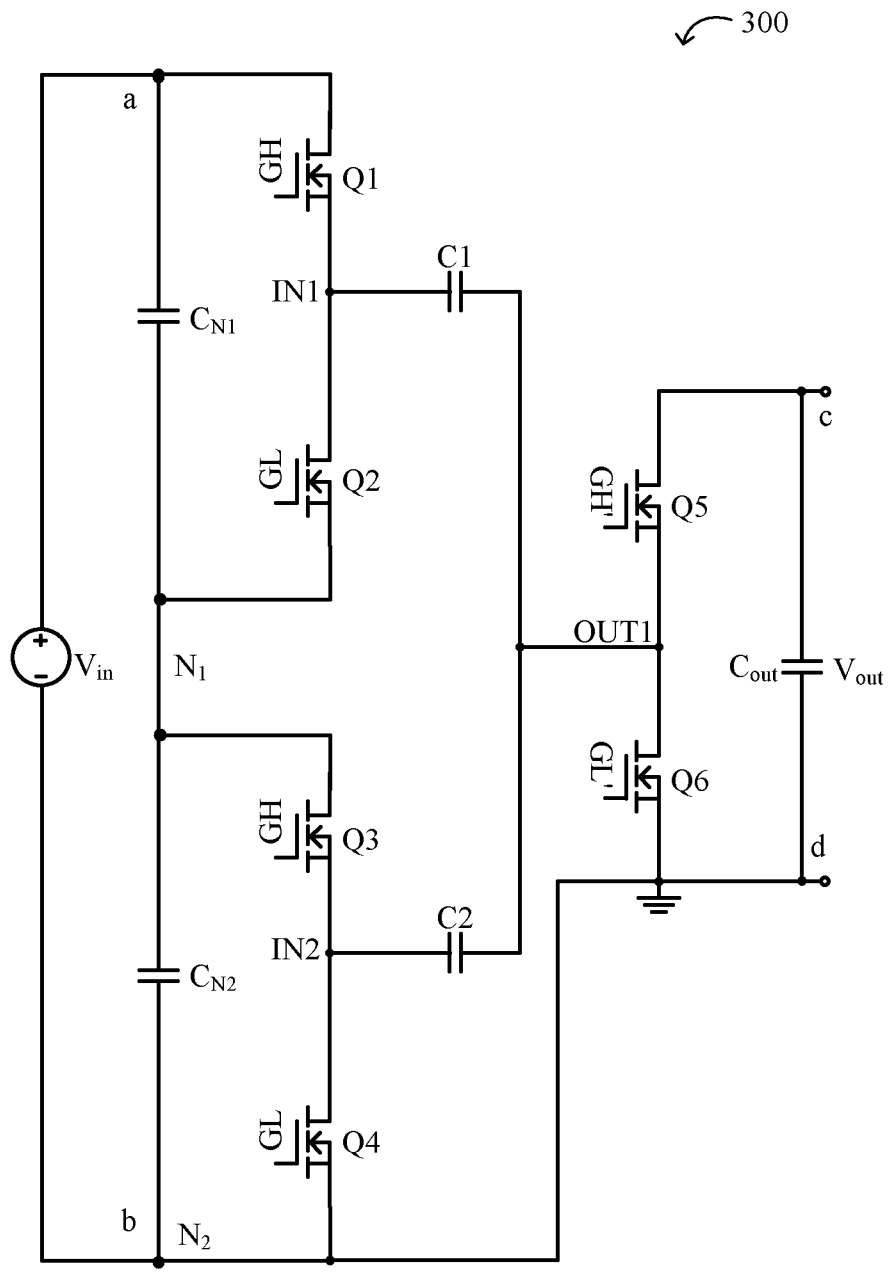
FIG. 3A is a circuit diagram of a second example voltage regulator, in accordance with embodiments of the present invention.

Referring now to FIG. 3A, shown is a circuit diagram of a second example voltage regulator, in accordance with embodiments of the present invention. In this particular example, N is equal to 2; that is, the step-down ratio of the input voltage to the output voltage is 2. Voltage regulator 300 can include an input port with two terminals a and b for receiving input voltage $V_{in}$. Here, terminal a is a positive terminal and terminal b is a negative terminal. Voltage regulator 300 can include an output port with two terminals c and d for generating output voltage $V_{out}$, and being coupled to a load. Here, terminal c is a positive terminal and terminal d is a negative terminal. The input port and the output port may have the same ground terminal. In the embodiments, terminal b and terminal d can be coupled to the same ground terminal.

Voltage regulator 300 can also include a group of input switches coupled in series between terminals a and b of the input port. In this particular example, there are 4 input switches, such as input switches Q1, Q2, Q3, and Q4. The common nodes of every two adjacent input switches are taken as input switches nodes, respectively. For example, the common node of input switches Q1 and Q2 is IN1, and the common node of input switches Q3 and Q4 is IN2. Input switches Q1 and Q2 may form an input half-bridge topology, and input switches Q3 and Q4 form another input half-bridge topology. Further, voltage regulator 300 can include an output half-bridge topology between terminals c and d of the output port. The output half-bridge topology can include two output switches Q5 and Q6 coupled in series, and the common node of output switches Q5 and Q6 is taken as output switch node OUT1.

Also, voltage regulator 300 can include two storage capacitors, where a first terminal of each storage capacitor can be coupled to a corresponding different input switch node, and a second terminal of each storage capacitor can be coupled to one output switch node. For example, storage capacitor C1 is coupled between input switch node IN1 and output switch node OUT1, and storage capacitor C2 can be coupled between input switch node IN2 and output switch node OUT1, such that each path from the input port to the output port can include at least one storage capacitor. The switching states of input switches Q1-Q4 and output switches Q5-Q6 can be controlled to be switched, in order to control the charging and discharging states of storage capacitors C1 and C2, such that a ratio of the input voltage and the output voltage is 2.

Voltage regulator 300 can also include two input capacitors $C_{N1}$ and $C_{N2}$, each of which is coupled between two terminals of a corresponding input half-bridge topology. Here, input capacitor $C_{N1}$ is coupled between two terminals of the input half-bridge topology formed by input switches Q1 and Q2, and input capacitor $C_{N2}$ is coupled between two terminals of the input half-bridge topology formed by input switches Q3 and Q4. In addition, voltage regulator 300 may further include output capacitor $C_{out}$ coupled between terminals c and d of the output port to filter output voltage $V_{out}$.

Figure 3B:
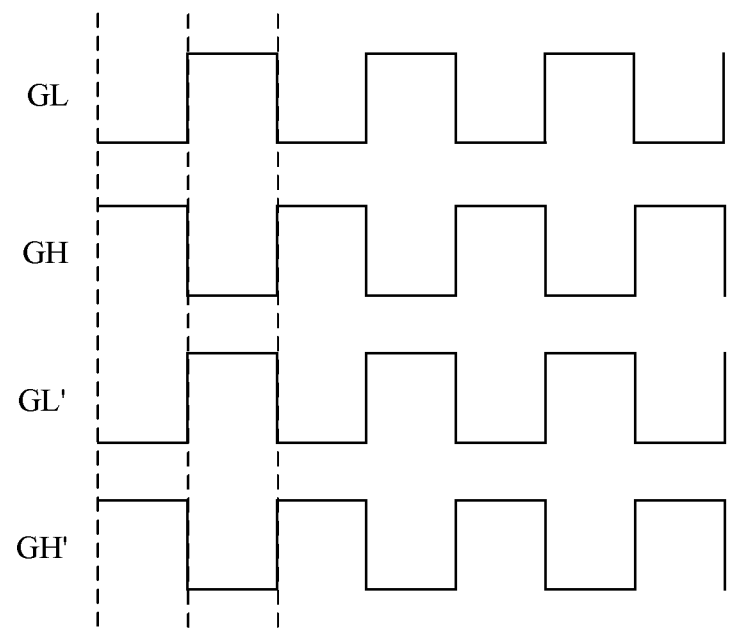
FIG. 3B is a waveform diagram of control signals for the second example voltage regulator, in accordance with embodiments of the present invention.

Referring now to FIG. 3B, shown is a waveform diagram of control signals for the second example voltage regulator, in accordance with embodiments of the present invention. In this control mode, the switching states of the high-side input switches of each input half-bridge topology and the high-side output switch of the output half-bridge topology may be identical. In this example, the switching states of high-side input switches Q1 and Q3 can be controlled by control signal GH, and the switching states of high-side output switch Q5 can be controlled by control signal GH', which is the same as control signal GH. The low-side input switches of each input half-bridge topology and the low-side output switch of the output half-bridge topology may have the same switching state. In this example, the switching states of low-side input switches Q2 and Q4 can be controlled by control signal GL, and the switching states of low-side output switch Q6 can be controlled by control signal GL', which is the same as control signal GL.

In some embodiments, control signals GH and GL are complementary, and similarly, control signals GH' and GL' are complementary within one switching period. Also, phase shift control with 180° can be applied in other embodiments; that is, the phase difference between control signals GH and GL can be controlled to be 180°. For example, the duty cycle of control signal GH may be 50%, 40%, or other suitable values. In one switching period, the operation process of voltage regulator 300 can include two operation states.

Figure 3C:
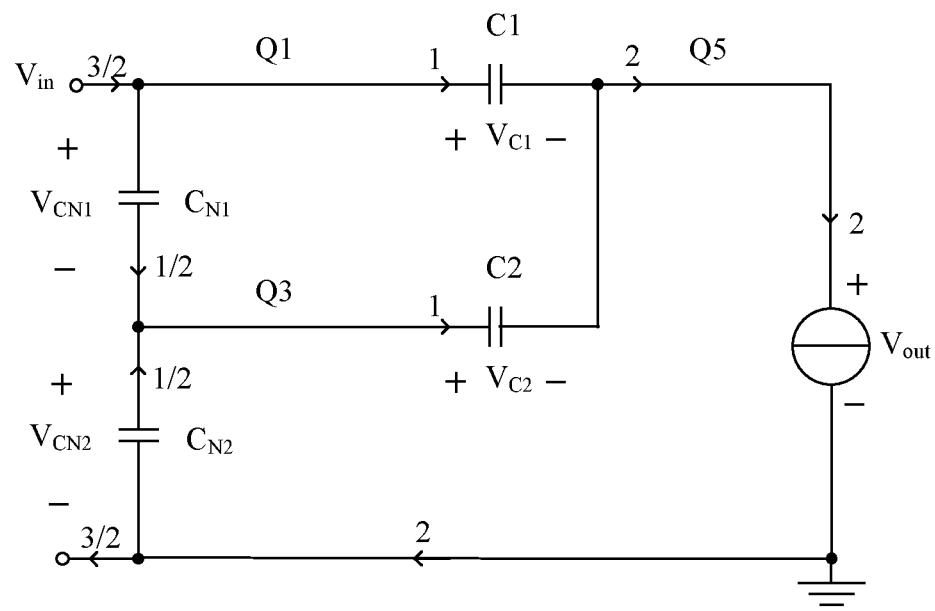
FIG. 3C is an equivalent circuit diagram of the second example voltage regulator in the first operation state, in accordance with embodiments of the present invention.

Referring now to FIG. 3C, shown is an equivalent circuit diagram of the second example voltage regulator in the first operation state, in accordance with embodiments of the present invention. In this particular example, control signals GH and GL are complementary with the duty cycle of 50%. In the first operation state, high-side input switches Q1 and Q3 are turned on and high-side output switch Q5 is turned on. Accordingly, low-side input switches Q2 and Q4 are turned off, and low-side output switch Q6 is turned off. Input voltage $V_{in}$ and input capacitor $C_{N2}$ may provide energy to charge storage capacitors C1 and C2 and input capacitor $C_{N1}$, and also provide energy to the load. Input voltage $V_{in}$ may provide energy to charge storage capacitor C1 through input switch Q1 and charge input capacitor $C_{N1}$ at the same time. Input capacitor $C_{N2}$ may provide energy to charge storage capacitor C2 through input switch Q3.

In this equivalent circuit, the first current path is: positive terminal a of the input port—input switch Q1—storage capacitor C1—output switch Q5—positive terminal c of the output port—negative terminal d of the output port. The second current path is: input capacitor $C_{N2}$—input switch Q3—storage capacitor C2—output switch Q5—positive terminal c of the output port—negative terminal d of the output port. The third current path is: positive terminal a of the input port—input capacitor $C_{N1}$—input switch Q3—storage capacitor C2—output switch Q5—positive terminal c of the output port—negative terminal d of the output port.

For example, providing that the current flowing through the output port is 2, the output current flowing through positive terminal a of the input port is 3/2, the charge current flowing through storage capacitor C1 through input switch Q1 is 1, and the charge current flowing through input capacitor $C_{N1}$ is 1/2. The current flowing into negative terminal b of the input port is 3/2, the discharge current flowing through input capacitor $C_{N2}$ is 1/2, and the charge current flowing through storage capacitor C2 is 1. Therefore, in the first operation state, it can be obtained according to Kirchhoff's law of voltage that:

$$V_{CN1}+V_{CN2}=V_{in} \quad (1)$$

In this example, $V_{CN1}$ is the voltage across input capacitor $C_{N1}$, and $V_{CN2}$ is the voltage across input capacitor $C_{N2}$. Also, it can be obtained that:

$$V_{C1}-V_{C2}=V_{CN1} \quad (2)$$

In this example, $V_{C1}$ is the voltage across storage capacitor C1, and $V_{C2}$ is the voltage across storage capacitor C2. Further, it can be obtained that:

$$V_{CN2}-V_{C2}=V_{out} \quad (3)$$

Figure 3D:
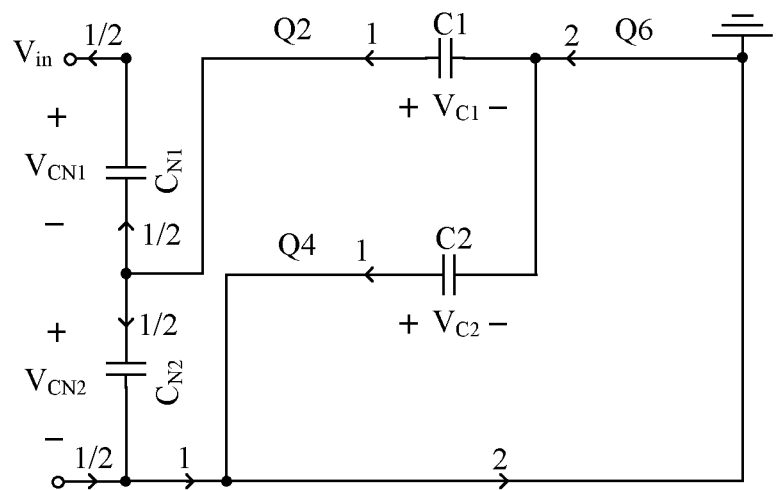
FIG. 3D is an equivalent circuit diagram of the second example voltage regulator in the second operation state, in accordance with embodiments of the present invention.

Referring now to FIG. 3D, shown is a an equivalent circuit diagram of the second example voltage regulator in the second operation state in accordance with embodiments of the present invention. In the second operation state, high-side input switches Q1 and Q3 are turned off, and high-side output switch Q5 is turned off. Accordingly, low-side input switches Q2 and Q4 are turned on, and low-side output switch Q6 is turned on. Storage capacitors C1 and C2, and input capacitor $C_{N1}$ discharge energy to input capacitor $C_{N2}$ and input port. Since the two terminals of storage capacitor C2 are coupled to the ground terminal in the equivalent circuit, the voltage across storage capacitor C2 is zero. In this equivalent circuit, the first current path is: storage capacitor C1—input switch Q2—input capacitor $C_{N2}$—negative terminal b of the input port. The second current path is: input capacitor $C_{N1}$—positive terminal a of the input port.

For example, providing that the current flowing through the output port is 2, the discharge current flowing through storage capacitor C1 is 1, the discharge current flowing through storage capacitor C2 is 1, the charge current flowing through input capacitor $C_{N2}$ is 1/2, the discharge current flowing from input capacitor $C_{N1}$ to positive terminal a of the input port is 1/2, and the output current flowing through negative terminal b of the input port is 1/2. Therefore, in the second operation state, it can be obtained according to Kirchhoff's law of voltage that:

$$V_{CN1}+V_{CN2}=V_{in} \quad (4)$$

$$V_{C1}-V_{C2}=V_{CN2} \quad (5)$$

$$V_{C2}=0 \quad (6)$$

When the voltage regulator is switched between the first and second operation states at a higher frequency, the voltages across the capacitors do not suddenly change between different states, such that each parameter in the first operation state is basically equal to the corresponding parameter in the second operation state. Therefore, combining the above formulas (1)-(6), it can be derived that:

$$V_{CN1}=V_{CN2}=V_{in}/2 \quad (7)$$

$$V_{out}=V_{in}/2 \quad (8)$$

Therefore, output voltage $V_{out}$ may be stepped down by the voltage regulator according to the embodiments, and the value of output voltage $V_{out}$ can be 1/2 of input voltage $V_{in}$.

Figure 4A:
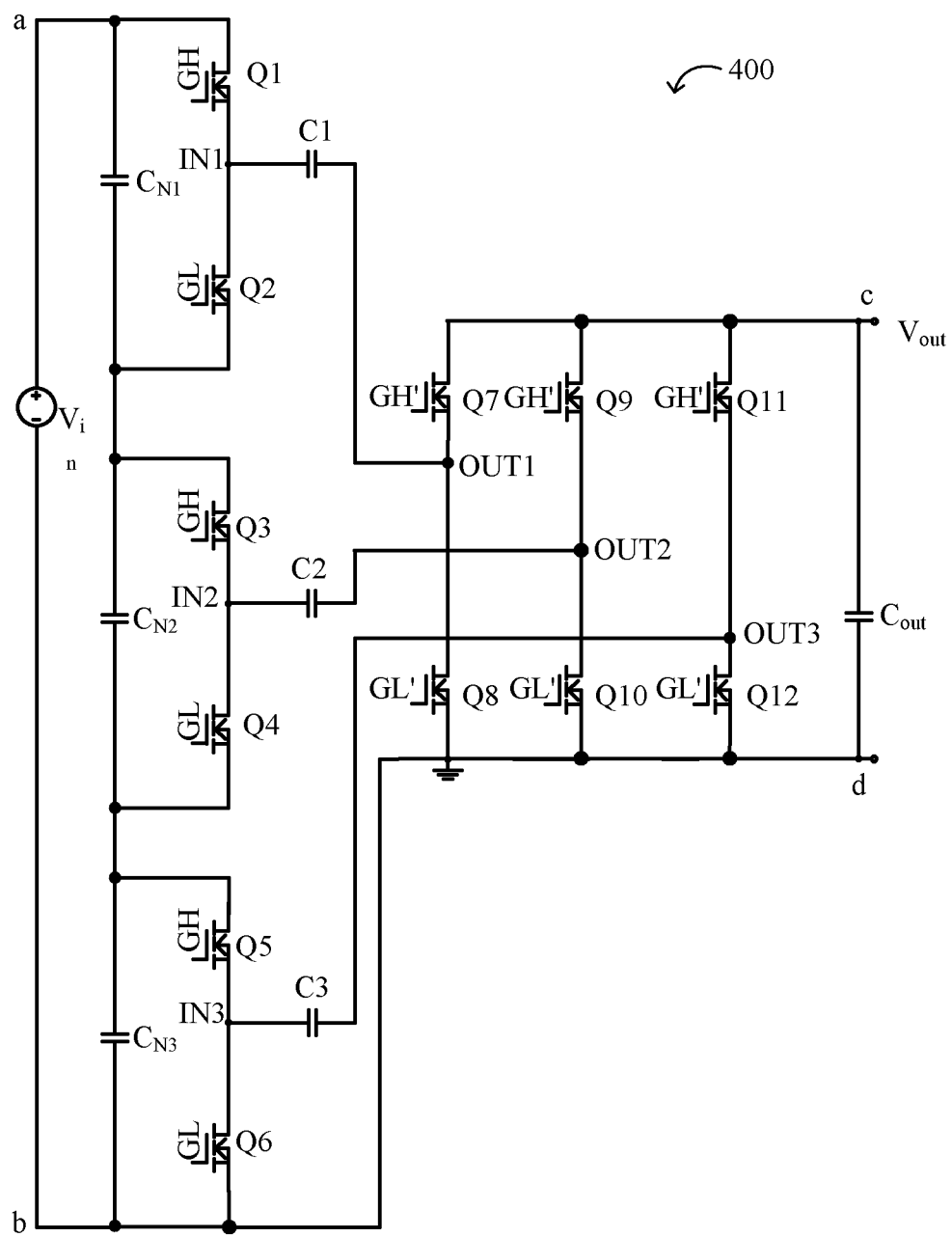
FIG. 4A is a circuit diagram of a third example voltage regulator, in accordance with embodiments of the present invention.

Referring now to FIG. 4A, shown is a circuit diagram of a third example voltage regulator in accordance with embodiments of the present invention. In this particular example, the step-down ratio of the input voltage to the output voltage is 3, that is, N=3. Voltage regulator 400 can include an input port with two terminals a and b for receiving input voltage $V_{in}$. Here, terminal a is a positive terminal and terminal b is a negative terminal. Voltage regulator 400 can include an output port with two terminals c and d for generating output voltage $V_{out}$, and being coupled to a load. Here, terminal c is a positive terminal and terminal d is a negative terminal. The input port and the output port may have the same ground terminal. In the embodiments, terminal b and terminal d can be coupled to the same ground terminal.

Voltage regulator 400 can also include three input half-bridge topology coupled in series between terminals a and b of the input port. Each input half-bridge topology can include a high-side input switch and a low-side input switch coupled in series, and the common node of the two input switches is taken as an input switch node. For example, the common node of input switches Q1 and Q2 is IN1, the common node of input switches Q3 and Q4 is IN2, and the common node of input switches Q5 and Q6 is IN3. Also, voltage regulator 400 can include three input capacitors $C_{IN1}$, $C_{IN2}$, $C_{IN3}$, and each input capacitor may be coupled between two terminals of a corresponding input half-bridge topology.

Further, voltage regulator 400 can include at least one output half-bridge topology coupled in parallel between terminals c and d of the output port. Each output half-bridge topology can include two output switches coupled in series, and the common node of the two output switches is taken as an output switch node. In this example, the number of the output half-bridge topology is 3. The common node of output switches Q7 and Q8 is output switch node OUT1, the common node of output switches Q9 and Q10 is output switch node OUT2, and the common node of output switches Q11 and Q12 is output switch node OUT3. Moreover, the high-side output switches (Q7, Q9, Q11) of each output half-bridge topology are coupled to positive terminal c of the output port, and the low-side output switches (Q8, Q10, Q12) are coupled to negative terminal d of the output port.

Also, voltage regulator 400 can include three storage capacitors C1, C2 and C3, which are coupled between one input switch node and one output switch node correspondingly. First terminals of the storage capacitors can respectively be coupled to different input switch nodes, and the output switch nodes that second terminals of the storage capacitors are coupled to can be different or the same. However, each output switch node can be coupled to at least one storage capacitor, such that each path from the input port and the output port can include at least one storage capacitor. In this example, storage capacitors C1, C2 and C3 are coupled to different output switch nodes. Storage capacitor C1 is coupled between input switch node IN1 and output switch node OUT1, storage capacitor C2 is coupled between input switch node IN2 and output switch node OUT2, and storage capacitor C3 is coupled between input switch node IN3 and output switch node OUT3. Moreover, the switching states of input switches Q1-Q6 and output switches Q7-Q12 are controlled to be switched, in order to control the charging and discharging states of storage capacitors C1, C2, and C3, such that the ratio of input voltage $V_{in}$ to output voltage $V_{out}$ is 3. In some embodiments, voltage regulator 400 may further include output capacitors $C_{out}$ coupled between terminals c and d of the output port.

Figure 4B:
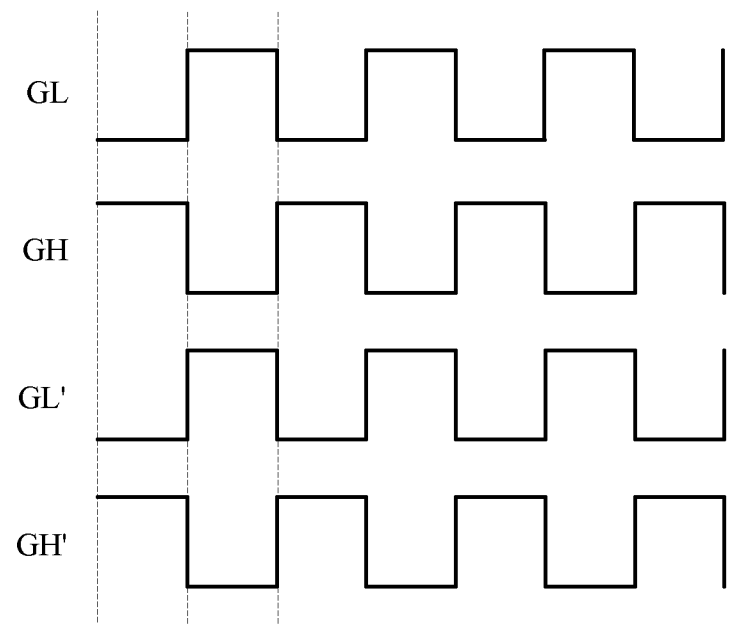
FIG. 4B is a waveform diagram of control signals for the third example voltage regulator, in accordance with embodiments of the present invention.

Referring now to FIG. 4B, shown is a waveform diagram of control signals for the third example voltage regulator, in accordance with embodiments of the present invention. In this example control mode, the switching states of the high-side input switches of each input half-bridge topology and the high-side output switches of the output half-bridge topologies may be identical. The switching states of the high-side input switches can be controlled by control signal GH, and the switching states of the high-side output switches can be controlled by control signal GH'. The low-side input switches of each input half-bridge topology and the low-side output switches of the output half-bridge topologies have the same switching state. In this example, the switching states of the low-side input switches may be controlled by control signal GL, and the switching states of the low-side output switches can be controlled by control signal GL'.

In some embodiments, control signals GH and GL may be controlled to be complementary, and similarly, control signals GH' and GL' are complementary within one switching period. Also, phase shift control with 180° can be applied in other embodiments; that is, the phase difference between control signals GH and GL is controlled to be 180°. The duty cycle of control signal GH may be 50%, 40%, or other suitable values. In one switching period, the operation process of voltage regulator 400 can include two operation states.

Figure 4C:
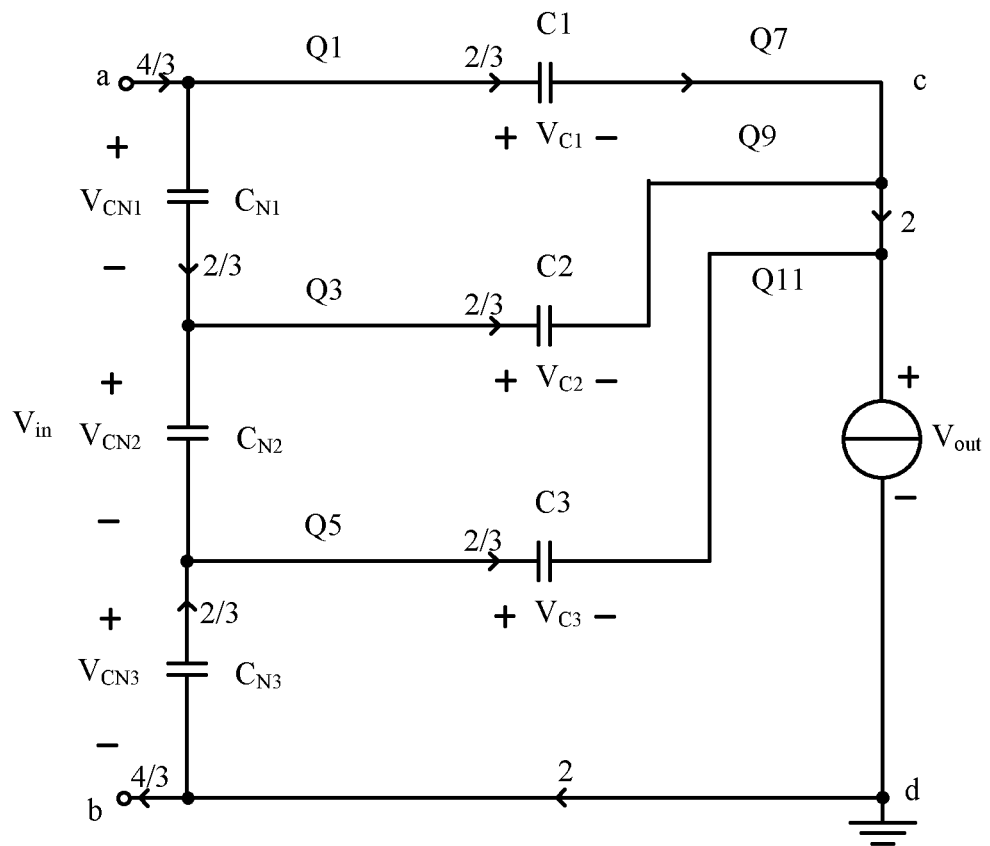
FIG. 4C is an equivalent circuit diagram of the third example voltage regulator in the first operation state, in accordance with embodiments of the present invention.

Referring now to FIG. 4C, shown is an equivalent circuit diagram of the third example voltage regulator in the first operation state in accordance with embodiments of the present invention. In this particular example, control signals GH and GL are complementary with the duty cycle of 50%. In the first operation state, high-side input switches Q1, Q3, and Q5 are turned on and high-side output switches Q7, Q9, and Q11 are turned on. Accordingly, low-side input switches Q2, Q4, and Q6 are turned off, and low-side output switches Q8, Q10, and Q12 are turned off. Input voltage $V_{in}$ and input capacitor $C_{N3}$ may provide energy to charge storage capacitors C1, C2, C3, and input capacitor $C_{N1}$, and also may provide energy to the load. Input voltage $V_{in}$ may provide energy to charge storage capacitor C1 through input switch Q1 and charge input capacitor $C_{N1}$ and storage capacitor C2 through input switch Q3 at the same time. Input capacitor $C_{N3}$ may provide energy to charge storage capacitor C3 through input switch Q5.

In this equivalent circuit, the first current path is: positive terminal a of the input port—input switch Q1—storage capacitor C1—output switch Q7—positive terminal c of the output port—negative terminal d of the output port. The second current path is: positive terminal a of the input port—input capacitor $C_{N1}$—input switch Q3—storage capacitor C2—output switch Q9—positive terminal c of the output port—negative terminal d of the output port. The third current path is: input capacitor $C_{N3}$—input switch Q5—storage capacitor C3—output switch Q11—positive terminal c of the output port—negative terminal d of the output port.

For example, providing that the current flowing through the output port is 2, the charge current flowing through storage capacitor C1 through input switch Q1 is 2/3, the charge current flowing through storage capacitor C2 through input switch Q3 is 2/3, and the charge current flowing through storage capacitor C3 through input switch Q5 is 2/3. Then, the charge current flowing through input capacitor $C_{N1}$ is 2/3, the current flowing into positive terminal a of the input port is 4/3, the discharge current flowing through input capacitor $C_{N3}$ is 2/3, and the current flowing into negative terminal b of the input port is 4/3. Therefore, in the first operation state, it can be obtained according to Kirchhoff's law of voltage that:

$$V_{CN1}+V_{CN2}+V_{CN3}=V_{in} \quad (9)$$

Here, $V_{CN1}$ is the voltage across input capacitor $C_{N1}$, $V_{CN2}$ is the voltage across input capacitor $C_{N2}$, and $V_{CN3}$ is the voltage across input capacitor $C_{N3}$. Also, it can be obtained that:

$$V_{C1}-V_{C2}=V_{CN1} \quad (10)$$

$$V_{C2}-V_{C3}=V_{CN2} \quad (11)$$

$$V_{CN3}-V_{C3}=V_{out} \quad (12)$$

Here, $V_{C1}$ is the voltage across storage capacitor C1, $V_{C2}$ is the voltage across storage capacitor C2, and $V_{C3}$ is the voltage across storage capacitor C3.

Figure 4D:
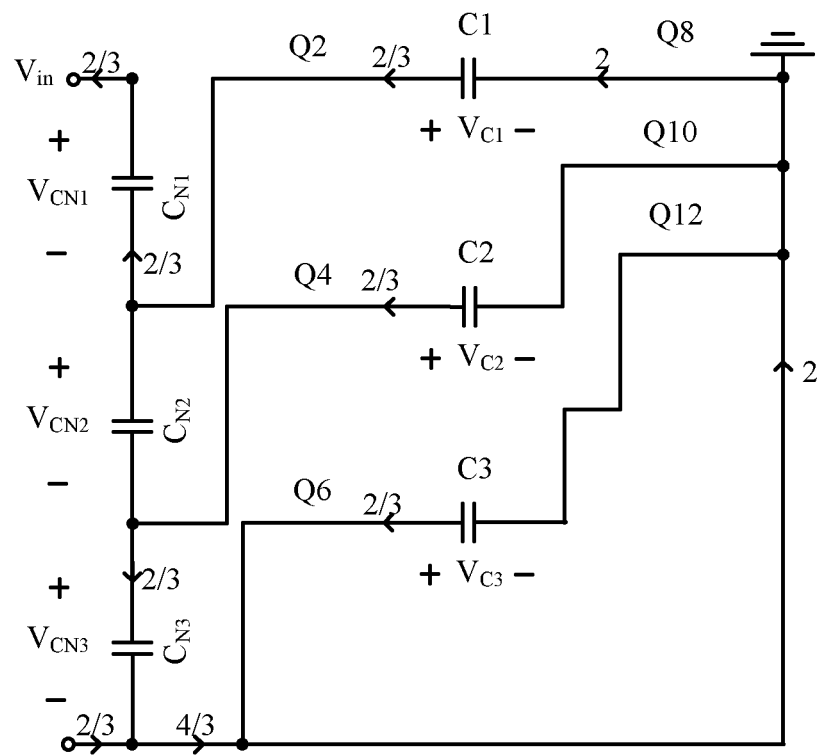
FIG. 4D is an equivalent circuit diagram of the third example voltage regulator in the second operation state, in accordance with embodiments of the present invention.

Referring now to FIG. 4D, shown is an equivalent circuit diagram of the third example voltage regulator in the second operation state, in accordance with embodiments of the present invention. In the second operation state, high-side input switches Q1, Q3, and Q5 are turned off, and high-side output switches Q7, Q9, and Q11 are turned off. Accordingly, low-side input switches Q2, Q4, and Q6 may be turned on, and low-side output switches Q8, Q10, and Q12 are turned on. Storage capacitors C1 to C3 and input capacitor $C_{N1}$ can discharge energy to input capacitor $C_{N3}$ and input port. Since the two terminals of storage capacitor C3 are coupled to the ground terminal, the voltage across storage capacitor C3 is zero.

In this equivalent circuit, the first current path is: storage capacitor C2—input switch Q4—input capacitor $C_{N3}$—negative terminal b of the input port. The second current path is: storage capacitor C1—input switch Q2—input capacitor $C_{N1}$—positive terminal a of the input port. For example, providing that the current flowing through the output port is 2, the discharge current flowing through storage capacitor C1 is 2/3, the discharge current flowing through storage capacitor C2 is 2/3, and the discharge current flowing through storage capacitor C3 is 2/3. Then the charge current flowing through input capacitor $C_{N3}$ is 2/3, the discharge current flowing from input capacitor $C_{N1}$ to positive terminal a of the input port is 2/3, and the output current flowing through negative terminal b of the input port is 2/3. Therefore, in the second operation state, it can be obtained according to Kirchhoff's law of voltage that:

$$V_{CN1}+V_{CN2}+V_{CN3}=V_{in} \quad (13)$$

$$V_{C1}-V_{C2}=V_{CN2} \quad (14)$$

$$V_{C2}-V_{C3}=V_{CN3} \quad (15)$$

$$V_{C3}=0 \quad (16)$$

When the voltage regulator is switched between the first and second operation states at a higher frequency, the voltages across the capacitors may not suddenly change between different states, such that each parameter in the first operation state is basically equal to the corresponding parameter in the second operation state. Therefore, combining the above formulas (10)-(16), it can be derived that:

$$V_{CN1}=V_{CN2}==V_{CN3}=V_{in}/3 \quad (17)$$

$$V_{out}=V_{in}/3 \quad (18)$$

Therefore, output voltage $V_{out}$ can be stepped down by the voltage regulator according to the embodiments, and the value of output voltage $V_{out}$ is 1/3 of input voltage $V_{in}$. It can be understood that in the embodiments, although the number of the output half-bridge topologies is the same as the step-down ratio or the number of storage capacitors, it can also be set to be different. For example, the number of the output half-bridge topologies is set to M, where M is not greater than N, and each output switch node is coupled to at least one storage capacitor. In the above embodiments, N is 2 and 3 respectively. For the embodiments where N is greater than 3, the circuit topology and operation process can be derived.

When the number of input switches is 2N, N input half-bridge topologies and N input switch nodes are sequentially formed. The first terminals of the N input capacitors are respectively coupled to the first to the Nth input switch nodes. Also, the number of the output half-bridge topologies is set to M, where M is not less than 1 and is not more than N, to form M output switch nodes. Each output switch node is coupled to at least one storage capacitor. The connection ways of all output half-bridge topologies to the output port are the same. The high-side output switches of each output half-bridge topology are coupled to the positive terminal of the output port, and the low-side output switches are coupled to the negative terminal of the output port.

In the embodiments, the number of input switches coupled in series between the input port is provided corresponding to the step-down ratio and at least one half-bridge topology coupled to the output port is arranged. The number of storage capacitors coupled between the input switch nodes and the output switch nodes is provided corresponding to the step-down ratio is provided. Also, the switching states of the input switches and the output switches are switched to correspondingly change the charging and discharging states of the storage capacitors, in order to obtain an output voltage with a certain step-down ratio. Therefore, a higher step-down ratio can be achieved with smaller volume, the circuit topology is simple, and the power density is high.

On the other hand, the input port and the output port have a common ground potential (e.g., the ground terminals of the input side circuit and the output side circuit are the same), such that the isolation between the input side and the output side is not required, thus further simplifying the circuit topology of the voltage regulator. At the same time, the storage capacitors are coupled between the input side circuit and the output side circuit of the voltage regulator, such that there is no direct loop between the input port and the output port, thereby ensuring that when the input switches and/or the output switches are damaged, such as short circuit, the storage capacitors always exist between the input port and the output port, preventing the direct connection between the load at the output port and the input voltage, protecting the load, and obtaining good reliability.

It can be understood that in the description of the operation process described above, the switching states of the high-side input switch and the low-side input switch of each input half-bridge topology are controlled to be complementary. The states of control signals GH and GL are complementary. It can be understood that the switching states of the high-side input switch and the low-side input switch of the input half-bridge topology can also be non-complementary. For example, the duty ratio of control signal GH for the high-side input switch is 40%, and the duty ratio of control signal GL for the low-side input switch is also 40%, and the phase difference between the two is controlled to 180°. In some embodiments, when the duty ratio is less than 50%, the phase difference between control signals GH and GL can also be greater than 180°.

Figure 5A:
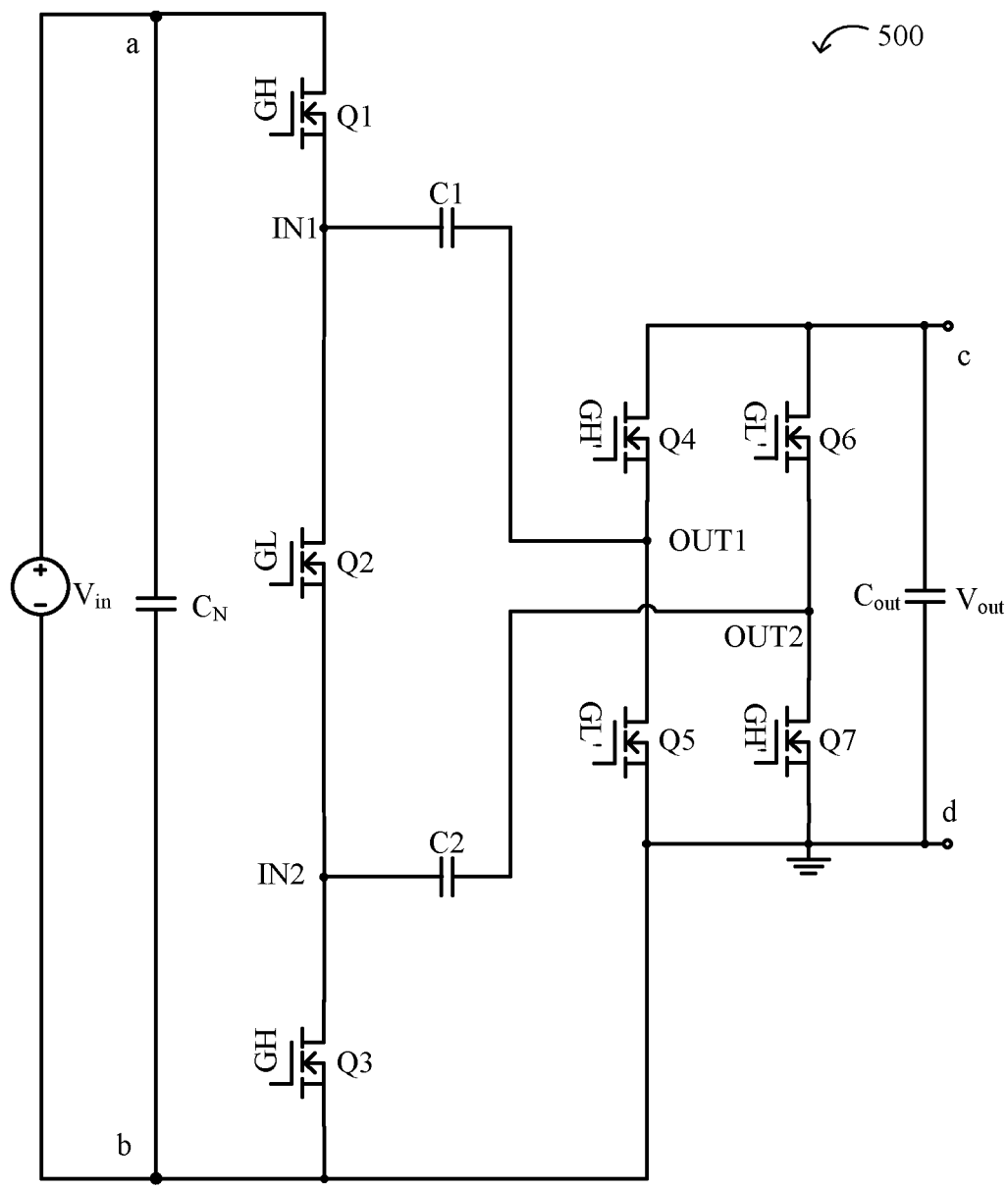
FIG. 5A is a circuit diagram of a fourth example voltage regulator, in accordance with embodiments of the present invention.

Referring now to FIG. 5A, shown is a circuit diagram of a fourth example voltage regulator, in accordance with embodiments of the present invention. In this particular example, N is equal to 2; that is, the step-down ratio of the input voltage to the output voltage is 2. Voltage regulator 500 can include an input port with two terminals a and b for receiving input voltage $V_{in}$. Here, terminal a is a positive terminal and terminal b is a negative terminal. Voltage regulator 500 includes an output port with two terminals c and d for generating output voltage $V_{out}$, and being coupled to a load. Here, terminal c is a positive terminal and terminal d is a negative terminal. The input port and the output port may have the same ground terminal. In the embodiments, terminal b and terminal d can be coupled to the same ground terminal.

Voltage regulator 500 can also include three input switches coupled in series between terminals a and b of the input port, which in turn form two input switch nodes. For example, the common node of input switches Q1 and Q2 is taken as input switch node IN1, and the common node of input switches Q2 and Q3 is taken as input switch node IN2. Input switches Q1 and Q2 form an input half-bridge topology, and input switches Q2 and Q3 form another input half-bridge topology.

Further, voltage regulator 500 can include two output half-bridge topologies coupled in parallel between terminals c and d of the output port, forming a full-bridge circuit. High-side output switch Q4 and low-side output switch Q5 can be coupled in series between terminals c and d of the output port, and the common node of output switches Q4 and Q5 taken as output switch node OUT1. High-side output switch Q6 and low-side output switch Q7 can be coupled in series between terminals c and d of the output port, and the common node of output switches Q6 and Q7 taken as output switch node OUT2. Positive terminal c of the output port is coupled to the high-side output switch of at least one output half-bridge topology.

Also, voltage regulator 500 can include two storage capacitors. Each storage capacitor may be coupled to one input switch node and one output switch node. A first terminal of each storage capacitor can be coupled to a corresponding different input switch node, and a second terminal of each storage capacitor can be coupled to an output switch node. Also, each output switch node may be coupled to at least one storage capacitor, such that each path between the input port and the output port can include at least one storage capacitor. In this example, storage capacitor C1 is coupled between input switch node IN1 and output switch node OUT1, and storage capacitor C2 is coupled between input switch node IN2 and output switch node OUT2.

In the embodiments, the switching states of input switches Q1-Q3 and output switches Q4-Q7 are controlled to be switched, in order to control the charging and discharging states of storage capacitors C1 and C2, such that a ratio of the input voltage and the output voltage is 2. In some embodiments, voltage regulator 500 may further include output capacitor $C_{out}$ coupled between terminals c and d of the output port to filter output voltage $V_{out}$. Similarly, voltage regulator 500 may further include input capacitor Cin coupled between terminals a and b of the input port to filter input voltage $V_{in}$.

Figure 5B:
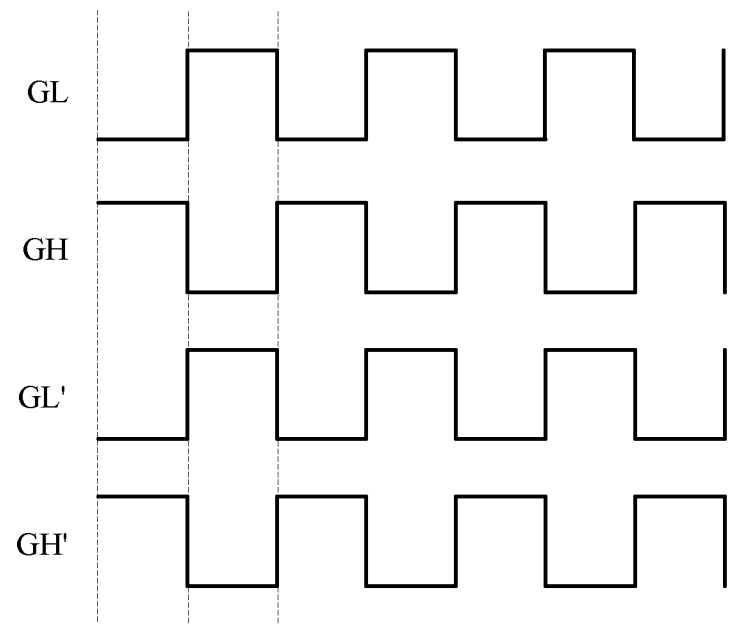
FIG. 5B is a waveform diagram of control signals for the fourth example voltage regulator, in accordance with embodiments of the present invention.

Referring now to FIG. 5B, shown is a waveform diagram of control signals for the fourth example voltage regulator in accordance with embodiments of the present invention. Under this control mode, among the three input switches, the switching states of the odd-numbered input switches Q1 and Q3 and the switching states of high-side output switches Q4 and Q7 of the output half-bridge topology are identical, and the switching states of the even-numbered input switch Q2 and the switching states of low-side output switches Q5 and Q6 of the output half-bridge topology are identical.

In this example, the switching states of input switches Q1 and Q3 are controlled by control signal GH, and the switching states of high-side output switches Q4 and Q7 are controlled by control signal GH'. The switching states of input switch Q2 can be controlled by control signal GL, and the switching states of low-side output switches Q5 and Q6 may be controlled by control signal GL'. In some embodiments, control signals GH and GL are complementary, and similarly, control signals GH' and GL' are complementary within one switching period. For example, the duty cycle of control signal GH may be 50%, 40%, or other suitable values. In one switching period, the operation process of voltage regulator 500 can include two operation states.

Figure 5C:
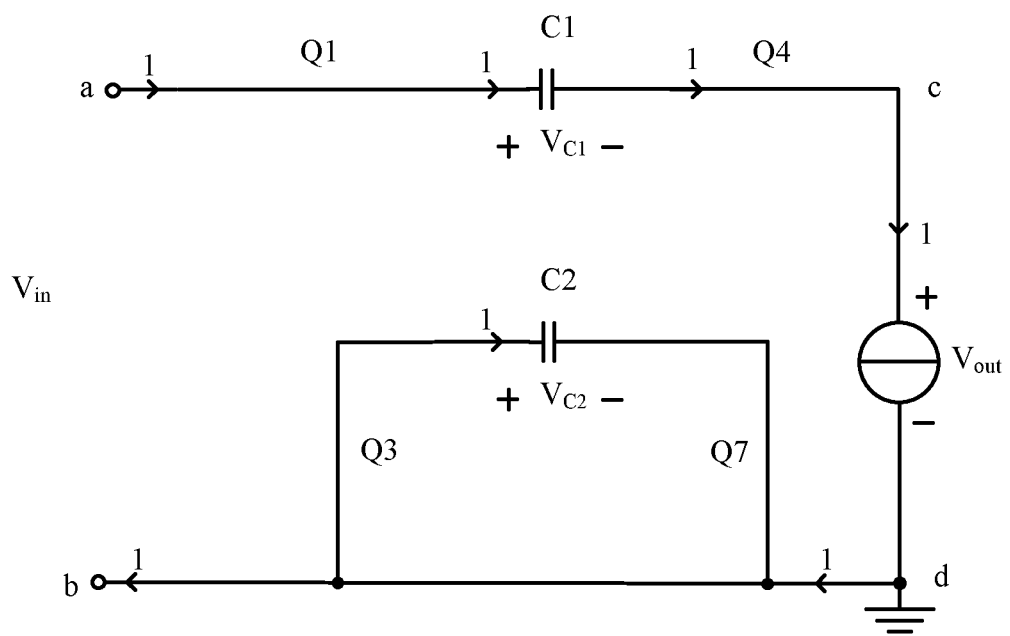
FIG. 5C is an equivalent circuit diagram of the fourth example voltage regulator in the first operation state, in accordance with embodiments of the present invention.

Referring now to FIG. 5C, shown is an equivalent circuit diagram of the fourth example voltage regulator in the first operation state, in accordance with embodiments of the present invention. In the first operation state, input switches Q1 and Q3 are turned on and high-side output switches Q4 and Q7 are turned on. Accordingly, input switch Q2 is turned off, and low-side output switches Q5 and Q6 are turned off. Input voltage $V_{in}$ may provide energy to charge storage capacitor C1, and also may provide energy to the load at the same time. The two terminals of storage capacitor C2 are coupled to the ground terminal in this equivalent circuit through input switch Q3 and output switch Q7. That is, the voltage across storage capacitor C2 is zero.

In this equivalent circuit, the first current path is: positive terminal a of the input port—input switch Q1—storage capacitor C1—output switch Q4—positive terminal c of the output port—negative terminal d of the output port. For example, providing that the current flowing from positive terminal c of the output port to negative terminal d of the output port is 1, the output current flowing through the positive terminal a of the input port is 1, the charge current flowing through storage capacitor C1 through input switch Q1 is 1. Therefore, in the first operation state, it can be obtained according to Kirchhoff's law of voltage that:

$$V_{C2}=0 \qquad (19)$$

$$V_{in}-V_{C1}=V_{out} \qquad (20)$$

Here, $V_{C1}$ is the voltage across storage capacitor C1, and $V_{C2}$ is the voltage across storage capacitor C2.

Figure 5D:
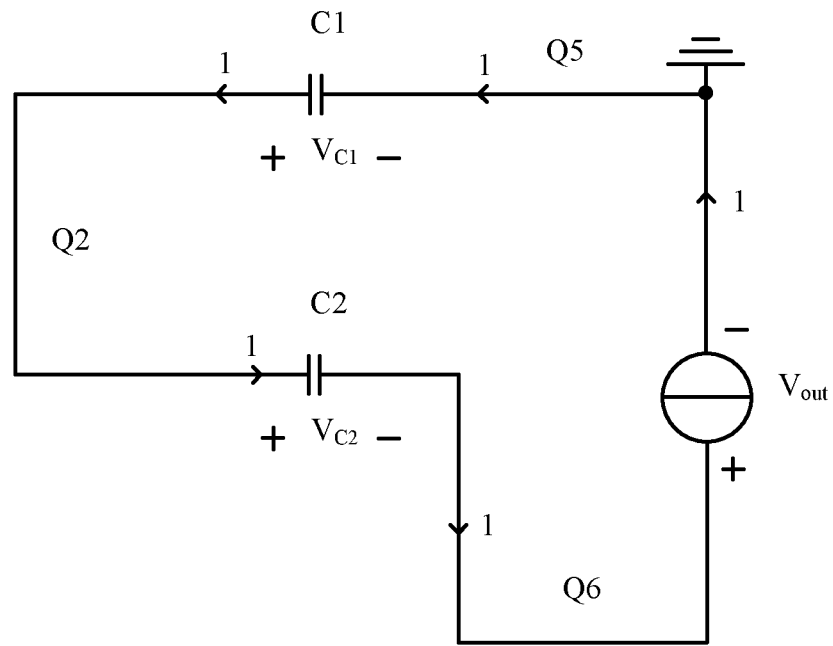
FIG. 5D is an equivalent circuit diagram of the fourth example voltage regulator in the second operation state, in accordance with embodiments of the present invention.

Referring now to FIG. 5D, shown is shown is an equivalent circuit diagram of the second example voltage regulator in the second operation state, in accordance with embodiments of the present invention. In the second operation state, input switches Q1 and Q3 are turned off, and high-side output switches Q4 and Q7 are turned off. Accordingly, input switch Q2 is turned on, and low-side output switches Q5 and Q6 are turned on. Storage capacitor C1 discharges energy to charge storage capacitor C2, and also may provide energy to the load.

In this equivalent circuit, the first current path is: the positive terminal of storage capacitor C1—input switch Q2—storage capacitor C2—output switch Q6—positive terminal c of the output port—output switch Q5—the negative terminal of storage capacitor C1. For example, providing that the current flowing from positive terminal c to negative terminal d of the output port is 1, the discharge current flowing through storage capacitor C1 is 1, the charge current flowing through storage capacitor C2 is 1. Therefore, in the second operation state, it can be obtained according to Kirchhoff's law of voltage that:

$$V_{C1}-V_{C2}=V_{out} \qquad (21)$$

When the voltage regulator is switched between the first and second operation states at a higher frequency, the voltages across the capacitors do not suddenly change between different states, such that each parameter in the first operation state is basically equal to the corresponding parameter in the second operation state. Therefore, combining the above formulas (19)-(21), it can be derived that:

$$V_{C2}=0 \qquad (22)$$

$$V_{out}=V_{C1}=V_{in}/2 \qquad (23)$$

Therefore, output voltage $V_{out}$ can be stepped down by the voltage regulator according to the embodiments, and the value of output voltage $V_{out}$ is 1/2 of input voltage $V_{in}$.

Figure 6A:
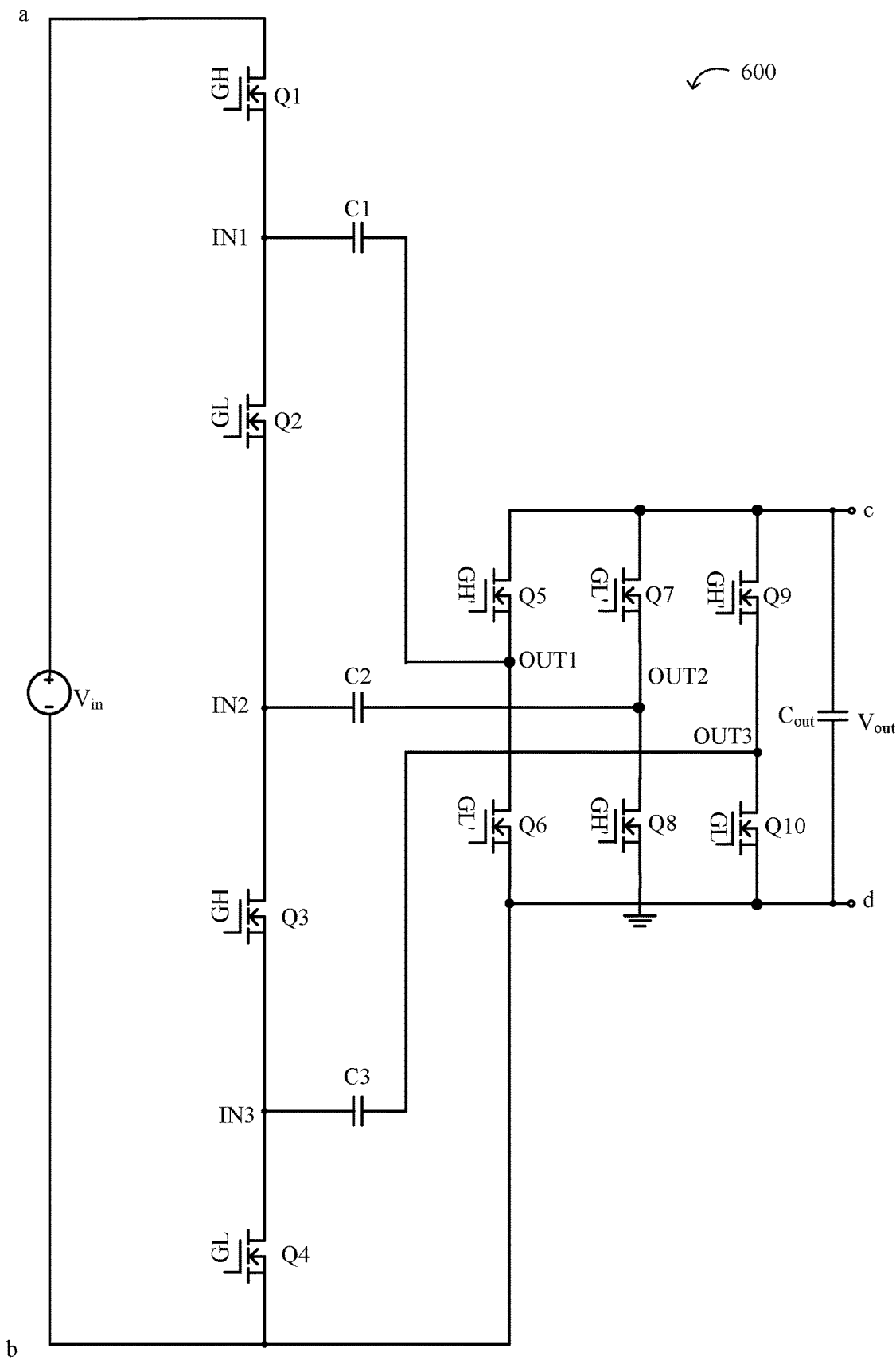
FIG. 6A is a circuit diagram of a fifth example voltage regulator, in accordance with embodiments of the present invention.

Referring now to FIG. 6A, shown is a circuit diagram of a fifth example voltage regulator in accordance with embodiments of the present invention. In this particular example, the step-down ratio of the input voltage to the output voltage is 3; that is, N=3. Voltage regulator 600 can include an input port with two terminals a and b for receiving input voltage $V_{in}$. Here, terminal a is a positive terminal and terminal b is a negative terminal. Voltage regulator 600 can include an output port with two terminals c and d for generating output voltage $V_{out}$, and being coupled to a load. Here, terminal c is a positive terminal and terminal d is a negative terminal. The input port and the output port may have the same ground terminal. In the embodiments, terminal b and terminal d may be coupled to the same ground terminal.

Voltage regulator 600 can also include four input switches Q1-Q4 coupled in series between terminals a and b of the input port. For example, the common node of input switches Q1 and Q2 is IN1, the common node of input switches Q2 and Q3 is IN2, and the common node of input switches Q3 and Q4 is IN3. Further, voltage regulator 600 can include three output half-bridge topologies coupled in parallel between terminals c and d of the output port. Each output half-bridge topology can include two output switches coupled in series, and the common node of the two output switches is taken as an output switch node. The common node of output switches Q5 and Q6 is output switch node OUT1, the common node of output switches Q7 and Q8 is output switch node OUT2, and the common node of output switches Q9 and Q10 is output switch node OUT3.

Also, voltage regulator 600 can include three storage capacitors C1, C2 and C3, which are coupled between one input switch node and one output switch node. The first terminal of each storage capacitor is coupled to a corresponding different input switch node, and the second terminal of each storage capacitor is coupled to one output switch node. That is, each input switch node is coupled to a different storage capacitor, and each output switch node is coupled to at least one storage capacitor, such that each path from the input port to the output port can include at least one storage capacitor. In this example, storage capacitor C1 is coupled between input switch node IN1 and output switch node OUT1, storage capacitor C2 is coupled between input switch node IN2 and output switch node OUT2, and storage capacitor C3 is coupled between input switch node IN3 and output switch node OUT3.

It should be understood that, in this example, the number of the output half-bridge topologies is 3, but it can also be 2, and accordingly the second terminal of storage capacitor C3 can be coupled to output switch node OUT1 together with the second terminal of storage capacitor C1. Moreover, the switching states of input switches Q1-Q4 and output switches Q5-Q10 are controlled to be switched, in order to control the charging and discharging states of storage capacitors C1, C2, and C3, such that the ratio of input voltage $V_{in}$ to output voltage $V_{out}$ is 3. In some embodiments, voltage regulator 600 may further include output capacitors $C_{out}$ coupled between terminals c and d of the output port.

Figure 6B:
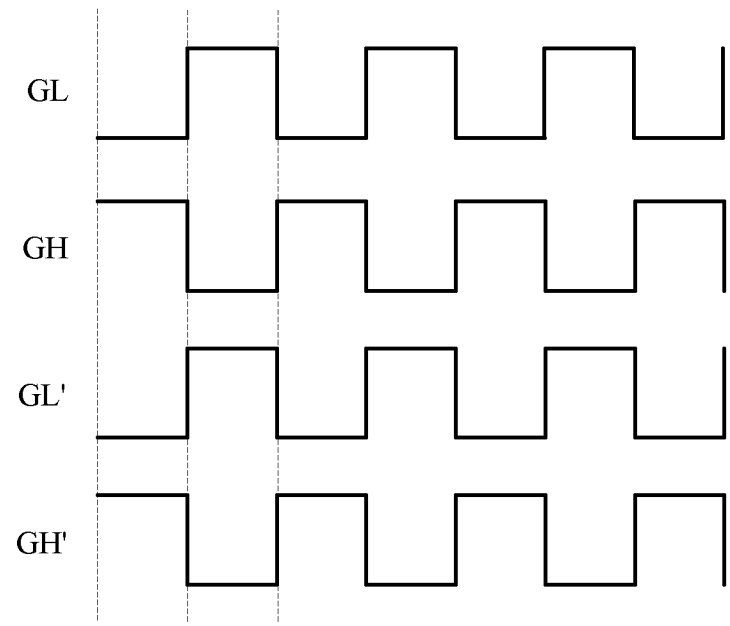
FIG. 6B is a waveform diagram of control signals for the fifth example voltage regulator, in accordance with embodiments of the present invention.

Referring now to FIG. 6B, shown is a waveform diagram of control signals for the fifth example voltage regulator, in accordance with embodiments of the present invention. In this example control mode, among the four input switches coupled in series, the switching states of the odd-numbered input switches Q1 and Q3 and the switching states of high-side output switches Q5, Q8, and Q9 of the output half-bridge topology are identical, and the switching states of the even-numbered input switches Q2 and Q4 and the switching states of low-side output switches Q6, Q7, and Q10 of the output half-bridge topology are identical.

In this example, the switching states of input switches Q1 and Q3 are controlled by control signal GH, and the switching states of high-side output switches Q5, Q8, and Q9 are controlled by control signal GH'. The switching states of input switches Q2 and Q4 are controlled by control signal GL, and the switching states of low-side output switches Q6, Q7 and Q10 are controlled by control signal GL'. In some embodiments, control signals GH and GL are complementary, and similarly, control signals GH' and GL' are complementary within one switching period. For example, the duty cycle of control signal GH may be 50%, 40%, or other suitable values. In one switching period, the operation process of voltage regulator 500 can include two operation states.

Figure 6C:
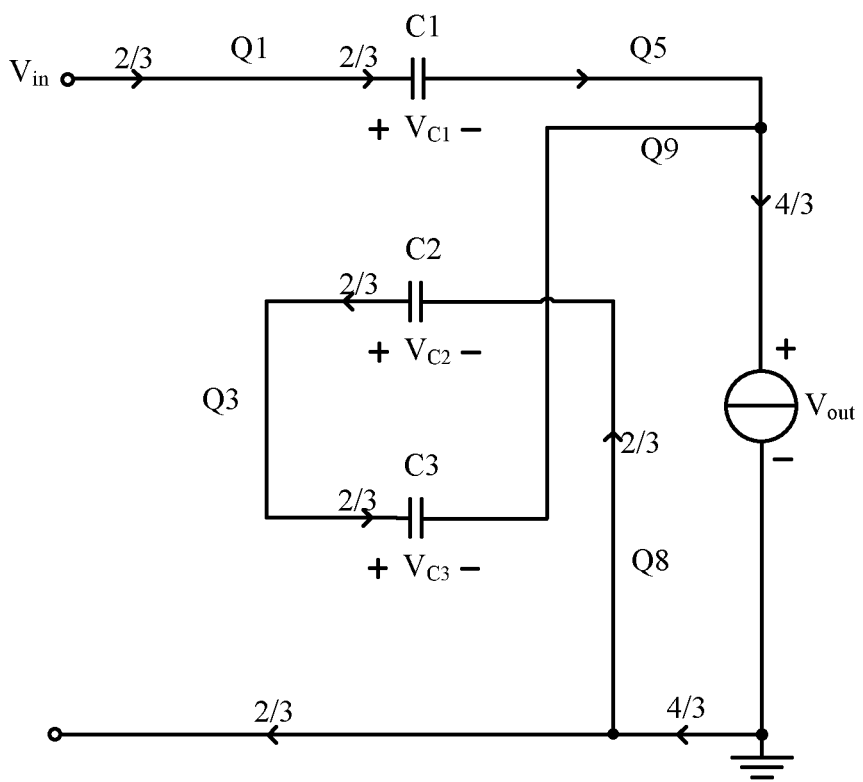
FIG. 6C is an equivalent circuit diagram of the fifth example voltage regulator in the first operation state, in accordance with embodiments of the present invention.

Referring now to FIG. 6C, shown is an equivalent circuit diagram of the fifth example voltage regulator in the first operation state in accordance with embodiments of the present invention. In the first operation state, input switches Q1 and Q3 are turned on and high-side output switches Q5, Q8, and Q9 are turned on. Accordingly, input switches Q2 and Q4 are turned off, and low-side output switches Q6, Q7, and Q10 are turned off. Input voltage $V_{in}$ provides energy to charge storage capacitor C1, and also may provide energy to the load through output switch Q5. Storage capacitor C2 discharges to charge storage capacitor C3 through input switch Q3, and also may provide energy to the load through output switch Q9.

In this equivalent circuit, the first current path is: positive terminal a of the input port—input switch Q1—storage capacitor C1—output switch Q5—positive terminal c of the output port—negative terminal d of the output port. The second current path is: storage capacitor C2—input switch Q3—storage capacitor C3—output switch Q9—positive terminal c of the output port—negative terminal d of the output port. For example, providing that the current flowing from positive terminal c of the output port to negative terminal d of the output port is 4/3, the charge current flowing through storage capacitor C1 through input switch Q1 is 2/3, the output current flowing from positive terminal a of the input port is 2/3. The charge current flowing through storage capacitor C3 through input switch Q3 is 2/3, and the current flowing into negative terminal b of the input port is 2/3. Therefore, in the first operation state, it can be obtained according to Kirchhoff's law of voltage that:

$$V_{C2} - V_{C3} = V_{out} \tag{24}$$

$$V_{in} - V_{C1} = V_{out} \tag{25}$$

Here, $V_{CN1}$ is the voltage across input capacitor $C_{N1}$, $V_{CN2}$ is the voltage across input capacitor $C_{N2}$, and $V_{CN3}$ is the voltage across input capacitor $C_{N3}$.

Figure 6D:
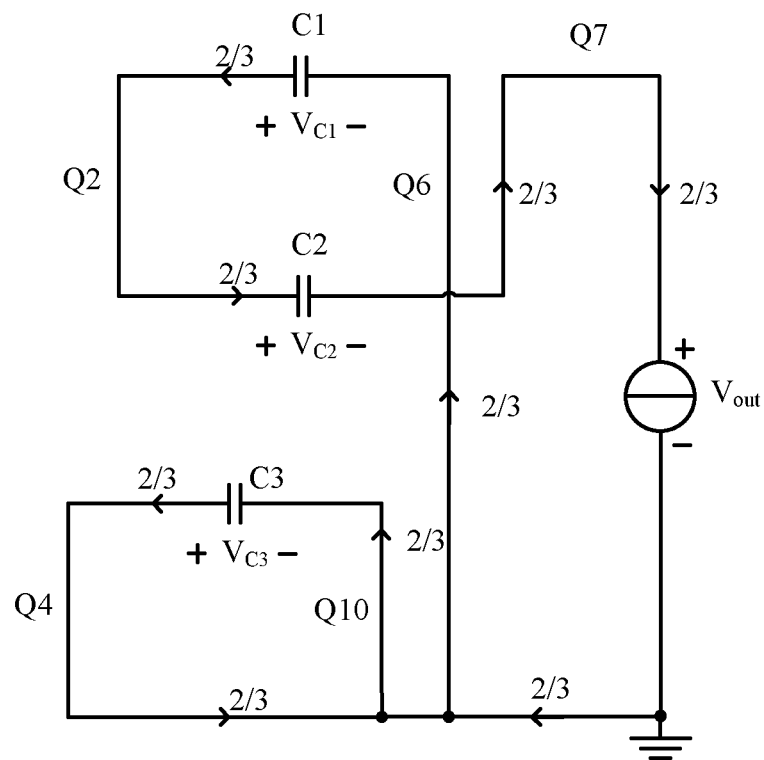
FIG. 6D is an equivalent circuit diagram of the fifth example voltage regulator in the second operation state, in accordance with embodiments of the present invention.

Referring now to FIG. 6D, shown is an equivalent circuit diagram of the fifth example voltage regulator in the second operation state, in accordance with embodiments of the present invention. In the second operation state, input switches Q1 and Q3 are turned off, and high-side output switches Q5, Q8, and Q9 are turned off. Accordingly, input switches Q2 and Q4 are turned on, and low-side output switches Q6, Q7, and Q10 are turned on. Storage capacitor C1 discharges energy to storage capacitor C2 through input switch Q2. Storage capacitor C3 discharges with two terminals coupled to the ground terminal respectively through input switch Q4 and output switch Q10. That is, the voltage across storage capacitor C3 is zero.

For example, providing that the current flowing through the output port is 2/3, the discharge current flowing through storage capacitor C1 is 2/3, and the charge current flowing through storage capacitor C2 is 2/3. Therefore, in the second operation state, it can be obtained according to Kirchhoff's law of voltage that:

$$V_{C3} = 0 \tag{26}$$

$$V_{C1} - V_{C2} = V_{out} \tag{27}$$

When the voltage regulator is switched between the first and second operation states at a higher frequency, the voltages across the capacitors do not suddenly change between different states, such that each parameter in the first operation state is basically equal to the corresponding parameter in the second operation state. Therefore, combining the above formulas (24)-(27), it can be derived that:

$$V_{out} = V_{C2} = V_{C1}/2 = V_{in}/3 \tag{28}$$

Therefore, output voltage $V_{out}$ is stepped down by the voltage regulator according to the embodiments, and the value of output voltage $V_{out}$ is 1/3 of input voltage $V_{in}$. In the description of the operation process described above, the switching states of the high-side input switch and the low-side input switch of each input half-bridge topology are controlled to be complementary. That is, the states of control signals GH and GL are complementary. It can be understood that the switching states of the high-side input switch and the low-side input switch of the input half-bridge topology can also be non-complementary. For example, the duty ratio of control signal GH for the high-side input switch is 40%, and the duty ratio of control signal GL for the low-side input switch is 40%, and the phase difference between the two is controlled to be 180°. In some embodiments, when the duty ratio is less than 50%, the phase difference between control signals GH and GL can also be greater than 180°.

In the above embodiments, N is 2 and 3, respectively, but other values of N can be supported in certain embodiments. For the embodiments where N is greater than 3, the circuit topology and operation process can be derived. When the number of the input switches is N+1, N input switch nodes can be formed in turn. At least one first-type output half-bridge topology and at least one second-type output half-bridge topology are coupled in parallel between two terminals of the output port. In the first-type output half-bridge topology, one high-side output switch and one low-side output switch are sequentially coupled in series between terminal c and terminal d. In the second-type output half-bridge topology, one low-side output switch and one high-side output switch are sequentially coupled in series between terminal c and terminal d. In each output half-bridge topology, the common node of the two output switches is taken as an output switch node. The input voltage and the output voltage have a common ground potential. The voltage regulator also includes N storage capacitors. The first terminal of each storage capacitor is coupled to a corresponding different input switch node, and the second terminal of each storage capacitor is coupled to one output switch node. The switching states of the input switches and the output switches are controlled to be switched so as to control the charging and discharging states of the storage capacitors, such that the ratio of the input voltage to the output voltage is N, where N is a natural number not less than 2.

Further, the first terminal of the Mth storage capacitor is coupled to the Mth input switch node, where M is not more than N. The second terminals of two adjacent storage capacitors are coupled to different types of the output half-bridge topology. When N is an odd number, the output half-bridge topologies coupled to the second terminals of the odd-numbered storage capacitors are of the same type with the output half-bridge topology coupled to the second terminal of the Nth storage capacitor. The output half-bridge topologies coupled to the second terminals of the even-numbered storage capacitors are of different types with the output half-bridge topology coupled to the second terminal of the Nth storage capacitor.

When N is an even number, the output half-bridge topologies coupled to the second terminals of the odd-numbered storage capacitors are of different types with the output half-bridge topology coupled to the second terminal of the Nth storage capacitor. The output half-bridge topologies coupled to the second terminals of the even-numbered storage capacitors are of the same type with the output half-bridge topology coupled the second terminal of the Nth storage capacitor. According to the voltage regulator in the embodiments, the storage capacitor is coupled between the input switches and the output switches. By switching the switching states of the input switches and the output switches, the charging and discharging states of the storage capacitors can be correspondingly changed, and the output voltage with a certain step-down ratio can be obtained. As a result, a higher step-down ratio can be achieved with a smaller volume.

In particular embodiments, the voltage regulator has simpler circuit topology, high power density and simpler working process, and is easier to be controlled. Also, the power supply process to the load is continuous, and the output voltage fluctuation is small. At the same time, the input port and the output port have a common ground potential (e.g., the ground terminals of the input side circuit and the output side circuit are the same), such that the isolation between the input side and the output side is not required, thereby further simplifying the circuit topology of the voltage regulator. In addition, the storage capacitors are coupled between the input side circuit and the output side circuit of the voltage regulator, such that there is no direct loop between the input port and the output port, thereby ensuring that when the input switches and/or the output switches are damaged, such as short circuit, the storage capacitors always exist between the input port and the output port, preventing the direct connection between the load at the output port and the input voltage, protecting the load, and obtaining good reliability.

It can be understood that the capacitance values of the storage capacitors can be the same or different, and the capacitance values of the input capacitors can also be the same or different. The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A voltage regulator, comprising:
   a) an input port with two terminals, and being configured to receive an input voltage;
   b) an output port with two terminals, and being configured to generate an output voltage, wherein the input port and the output port have a common ground potential;
   c) a group of input switches coupled in series between the two terminals of the input port, wherein a common node of every two adjacent input switches that form an input half-bridge topology is taken as an input switch node;
   d) at least one output half-bridge topology coupled between two terminals of the output port, wherein a common node of a high-side output switch and a low-side output switch in each output half-bridge topology is taken as an output switch node;
   e) N storage capacitors, wherein each of the storage capacitors is coupled between one input switch node and one output switch node, such that each path from the input port to the output port comprises at least one storage capacitor; and
   f) wherein switching states of the input switches and the output switches are controlled to be switched to control charging and discharging states of the storage capacitors, such that a ratio of the input voltage to the output voltage is N, wherein N is a natural number not less than 1.

2. The voltage regulator of claim 1, further comprising an output capacitor coupled between the two terminals of the output port to filter the output voltage.

3. The voltage regulator of claim 1, wherein the switching states of the odd-numbered input switches and the switching states of the high-side output switches are identical, and the switching states of the even-numbered input switches and the switching states of the low-side output switches are identical.

4. The voltage regulator of claim 3, wherein the switching states of the high-side output switches and the low-side output switches are complementary.

5. The voltage regulator of claim 3, wherein a conduction phase difference between the high-side output switches and the low-side output switches is 180°.

6. The voltage regulator of claim 5, wherein duty cycles of the high-side output switches and the low-side output switches are the same.

7. The voltage regulator of claim 1, wherein when the number of the input switches is configured as 2N, N input half-bridge topologies are formed, and each common node of two input switches in each input half-bridge topology is taken as the input switch node.

8. The voltage regulator of claim 7, wherein the voltage regulator further comprises N input capacitors, each of which is coupled to two terminals of a corresponding input half-bridge topology.

9. The voltage regulator of claim 7, wherein first terminals of the N storage capacitors are respectively coupled to different input switch nodes.

10. The voltage regulator of claim 7, wherein the number of the output half-bridge topology is 1, and second terminals of the N storage capacitors are coupled to the same output switch node.

11. The voltage regulator of claim 7, wherein the high-side output switches are coupled to a positive terminal of the output port, and the low-side output switches are coupled to a negative terminal of the output port.

12. The voltage regulator of claim 7, wherein the number of the output half-bridge topology is M, wherein M is not greater than N, and each of the output switch nodes is coupled to a second terminal of at least one storage capacitor.

13. The voltage regulator of claim 1, wherein when the number of the input switches is configured as N+1, every two adjacent input switches form one input half-bridge topology, thereby forming N input switch nodes, wherein N is a natural number not less than 2.

14. The voltage regulator of claim 13, wherein the number of the output half-bridge topology is not less than 2 and not greater than N, and the output half-bridge topologies comprise at least one first-type output half-bridge topology and at least one second-type output half-bridge topology, wherein the high-side output switch of the first-type output half-bridge topology is coupled to a positive terminal of the output port, and the low-side output switch of the second-type output half-bridge topology is coupled to a positive terminal of the output port.

15. The voltage regulator of claim 13, wherein a first terminal of each of the storage capacitors is respectively coupled to a different input switch node.

16. The voltage regulator of claim 13, wherein each of the output switch nodes is coupled to a second terminal of at least one storage capacitor.

17. The voltage regulator of claim 16, wherein every two adjacent storage capacitors are coupled to different types of the output half-bridge topologies.

18. The voltage regulator of claim 17, wherein when N is an odd number, the output half-bridge topologies coupled to the second terminals of the odd-numbered storage capacitors are of the same type with the output half-bridge topology coupled to the second terminal of the Nth storage capacitor, and the output half-bridge topologies coupled to the second terminals of the even-numbered storage capacitors are of different types with the output half-bridge topology coupled to the second terminal of the Nth storage capacitor.

19. The voltage regulator of claim 17, wherein when N is an even number, the output half-bridge topologies coupled to the second terminals of the odd-numbered storage capacitors are of different types with the output half-bridge topology coupled to the second terminal of the Nth storage capacitor, and the output half-bridge topologies coupled to the second terminals of the even-numbered storage capacitors are of the same type with the output half-bridge topology coupled the second terminal of the Nth storage capacitor.

* * * * *